No. 12,032. Reissued Sept. 16, 1902.

E. D. SCHMITT.

BOTTLE SEAL.

(Application filed June 14, 1902.)

Witnesses

T. K. Meacham

J. R. Nottingham

Inventor

Edward D. Schmitt by T. W. Johnson

Attorney.

UNITED STATES PATENT OFFICE.

EDWARD D. SCHMITT, OF BALTIMORE, MARYLAND, ASSIGNOR, BY MESNE ASSIGNMENTS, TO THE UNIVERSAL SEAL AND STOPPER COMPANY, OF CAMDEN, NEW JERSEY.

BOTTLE-SEAL.

SPECIFICATION forming part of Reissued Letters Patent No. 12,032, dated September 16, 1902.

Original No. 685,226, dated October 22, 1901. Application for reissue filed June 14, 1902. Serial No. 111,795.

DIVISION A.

*To all whom it may concern:*

Be it known that I, EDWARD D. SCHMITT, a citizen of the United States, residing in the city of Baltimore, in the State of Maryland, have invented new and useful Improvements in Bottle-Seals, of which the following is a specification.

This invention relates to new and useful improvements in bottle-sealing devices, especially adapted for sealing beverages under pressure.

One of the principal objects of this invention is to overcome the objections to seals of the "cap" type, in which the seal is effected between the sealing-disk and the upper edge of the bottle-neck, these objections being principally that the bottle in handling becomes chipped, and thus renders it impossible to make a perfect seal. I accomplish this object by affecting the seal in the neck of the bottle, a place that is protected and impossible to be affected by use in any way to prevent an absolutely perfect seal as long as the bottle lasts.

A further object is to provide a simple inexpensive seal that will not require a special tool to remove it, but which can be readily removed by hand; and a still further object is to provide a seal which may be reused as many times as desired and which when reapplied will be as perfect a seal as the first.

Other objects and advantages resulting from the herein-described combination of parts will become apparent in the course of the following description, and the novel features will be set forth in the claims.

Figure 1:
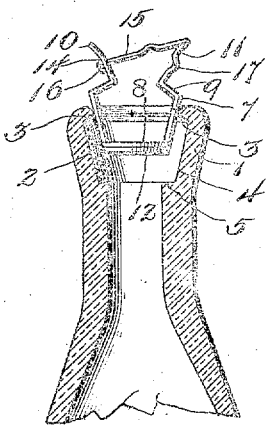
Figure 2:
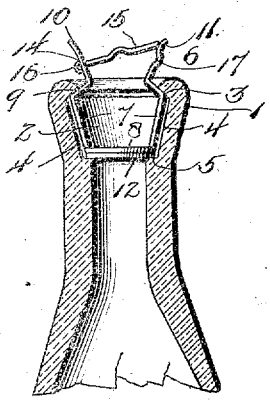
Figure 3:
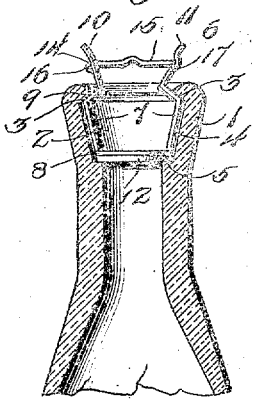
Figure 4:
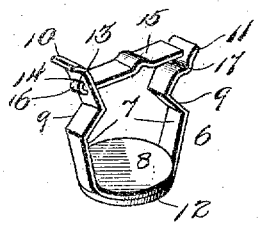
Figure 5:
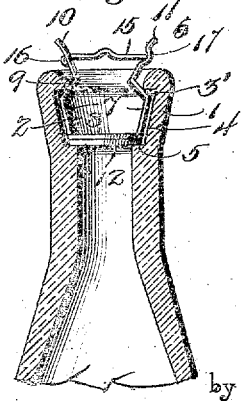

In the drawings illustrating my invention, Figure 1 is a sectional view of a bottle chambered in accordance with my invention, showing the securing member in the position it assumes just before the seal is effected. Fig. 2 is a similar view with the securing member in place in the bottle-neck, but not locked therein. Fig. 3 is the same as Fig. 2 with the securing member in place in the bottle-neck and locked. Fig. 4 is an enlarged perspective view of the securing member. Fig. 5 shows the formation of the bottle-neck slightly modified.

Referring to the drawings, the numeral 1 indicates the bottle-neck, having a chamber 2 formed therein, with preferably inclined shoulders 3, side walls 4, and a shoulder or seat 5 below the first-mentioned shoulder.

The numeral 6 designates the securing member, formed of a strip of spring metal stamped or otherwise shaped to form oppositely-disposed spring-arms 7, a horizontal cross-piece 8, and inclined shoulders 9 near its terminals, which terminals are extended a suitable distance above the mouth of the bottle, forming curved arms 10 and 11, by the aid of which the spring-arms are pressed toward each other when it is desired to unseal the bottle. Secured in any suitable manner to the cross-piece 8 is the sealing member or disk 12, which may be of cork, suitably-faced tin, wood, or the like and which is adapted to make sealing contact with the seat or shoulder 5.

In making the securing member I provide a narrow rectangular opening 13 for the reception of the narrowed portion 14 of a tongue 15, which narrowed portion is bent upon itself to form an eye 16, which prevents its withdrawal from the opening 13, and thus the tongue is hinged to the curved arm 10, with its free end adapted to enter a depression 17, made in the opposite arm 11.

In the sealing operation the securing member and the sealing member carried thereby are placed in the neck of the bottle and forced down until the sealing member makes sealing contact with the shoulder 5. The securing member in entering the mouth of the bottle will have its arms pressed together until said member has passed far enough to permit its arms to expand into the chamber 4, thus bringing the shoulders 9 into engagement with the inclined shoulder 3 in the bottle-neck. A seal is now effected, and to prevent the arms 10 and 11 from being accidentally forced toward each other the tongue 16 is forced with considerable force downward until the said arms 10 and 11 are separated sufficiently to permit the end of said tongue to enter the depression 17, when obviously the said arms will be prevented from moving toward each other.

To remove the seal, the operation is simple, it only being necessary to pry the tongue out of the depression 17 with the finger, thus permitting the arms to be sprung toward each other for a sufficient distance to disengage the shoulders 9 from the shoulder 3 in the bottle-neck, when the securing and sealing member will be readily removable.

It will be noted that while the inherent resilience of the securing member will bring the shoulders 9 into engagement with the inclined shoulder in the bottle-neck with sufficient force and with a constant tendency to seat the sealing member upon the shoulder 5 and effect a perfect seal the tongue 16, being brought into its final position with a positive pressure, will cause the arms 7 to further separate and in so doing will, by reason of the inclined shoulders on the arms, exert a further downward pressure.

It is highly desirable that the utility of a seal of this character be not destroyed upon the unsealing of the bottle for the first time, and it is obvious that the seal herein described may be reused as many times as desired, thus, for instance, enabling the portion of the beverage not desired for immediate use to be kept perfectly fresh and its gases retained.

In the modification, Fig. 5, the shoulder is not inclined, as in Figs. 1, 2, and 3, but straight, as indicated by the numeral 3′, which when engaged by the shoulders on the spring-arms will produce the same effect upon the securing member, due in this instance to the inclination of said shoulders.

Having described my invention, what I claim is—

1. In a bottle-seal, the combination with a bottle formed with a shoulder in its neck and near the mouth thereof and a shoulder below the first-mentioned shoulder, of a sealing member adapted to make contact with the lower shoulder, a spring-metal securing member formed with inclined shoulders thereon to engage the upper shoulder in the bottle-neck and a portion adapted to bear upon the sealing member, and means for locking the shoulders of the securing member in contact with the shoulder of the bottle-neck, substantially as described.

2. In a bottle-seal, the combination with a bottle formed with a shoulder in its neck near the mouth thereof and a shoulder below the first-mentioned shoulder, of a sealing member adapted to make contact with the lower shoulder, a spring-metal securing member formed with inclined shoulders thereon to engage the upper shoulder in the bottle-neck and a portion adapted to bear upon the sealing member and also having arms extending above the bottle-mouth, a tongue secured to one of said arms and adapted to engage the opposite arm to lock the arms apart, substantially as described.

3. In a bottle-seal, the combination with a bottle having an inclined shoulder in the neck thereof and a shoulder below said inclined shoulder, of a sealing member adapted to make sealing contact with the lower shoulder, a spring-metal securing member formed with inclined shoulders thereon to engage the inclined shoulder in the bottle-neck and a portion adapted to bear upon the sealing member and also having arms extending above the bottle-mouth for the purpose set forth, and means for locking said arms apart, substantially as described.

4. In a bottle-seal, the combination with a bottle formed with an inclined shoulder in the neck thereof and a shoulder below said inclined shoulder, of a sealing member adapted to make sealing contact with the lower shoulder, a spring-metal securing member formed with inclined shoulders thereon to engage the inclined shoulder in the bottle-neck and a portion adapted to bear upon the sealing member, and also having arms extending above the bottle-mouth, a tongue hinged or otherwise secured to one of said arms and adapted to engage the opposite arm to lock said arms apart, substantially as described.

5. In a bottle-seal, the combination with a bottle formed with an inclined shoulder in the neck thereof and a shoulder below said first-mentioned shoulder, of a sealing member adapted to make sealing contact with the lower shoulder, a spring-metal securing member formed with shoulders thereon to engage the upper inclined shoulder in the bottle-neck and a portion adapted to bear upon the sealing member and also having arms extending above the bottle-mouth, and means for locking the shoulders of the securing member in contact with the upper shoulder of the bottle-neck, substantially as described.

6. In a bottle-seal, the combination with a bottle having the inner wall of its neck formed with a sealing-seat, and with a shoulder above the sealing-seat, of a sealing member, a securing member adapted to bear upon the sealing member and to engage the shoulder, and means whereby the securing member is locked in engagement with said shoulder and against accidental disengagement, substantially as set forth.

7. In a bottle-seal, the combination with a bottle having the inner wall of its neck formed with a sealing-seat and with a shoulder above the sealing-seat, of a sealing member, a securing member adapted to bear upon the sealing member and to engage the shoulder, said securing member being provided with arms extending outside the bottle-mouth, and a tongue loosely attached to one of said arms and adapted to engage the opposite arm, whereby the securing member is locked in engagement with said shoulder against accidental disengagement.

8. In a bottle-seal, the combination with a bottle having the inner wall of its neck formed with a sealing-seat and a shoulder above the sealing-seat, of a sealing member, a securing member adapted to bear upon the sealing member and to engage the shoulder, and means located above said shoulder whereby the arms of the securing member are locked in engagement with said shoulder.

In testimony whereof I affix my signature in presence of two witnesses.

EDWARD D. SCHMITT.

Witnesses:

MABEL E. STEARNS,

JOHN W. HEWES.